Nov. 17, 1936. H. C. BOWEN 2,060,846
COMPENSATING MASTER CYLINDER
Filed Jan. 25, 1932
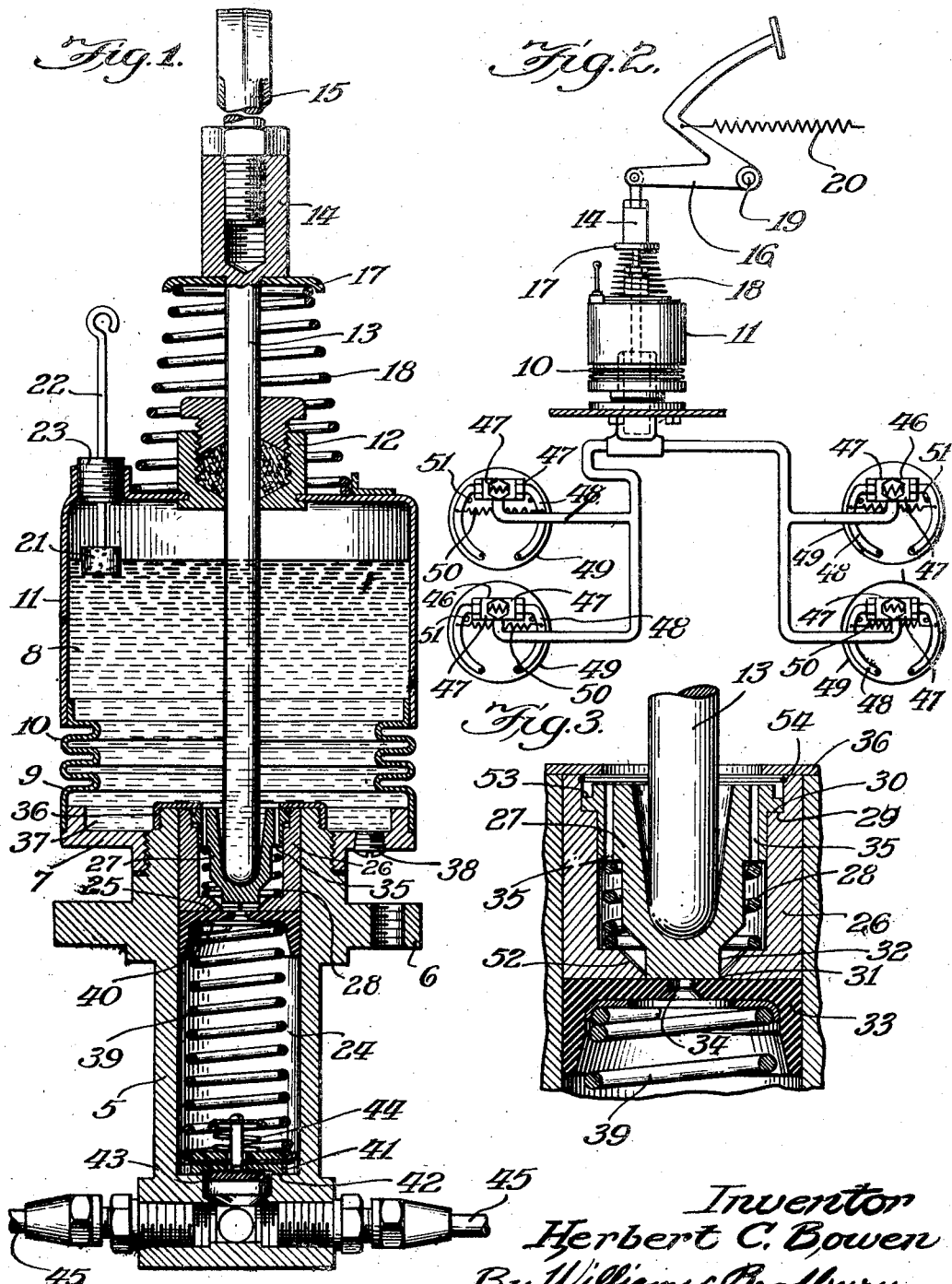
Inventor
Herbert C. Bowen
By Williams, Bradbury,
McCaleb & Hinkle
Attys Patented Nov. 17, 1936

2,060,846

UNITED STATES PATENT OFFICE 2,060,846

COMPENSATING MASTER CYLINDER

Herbert C. Bowen, Detroit, Mich., assignor to Hydraulic Brake Company, Detroit, Mich., a corporation of California Application January 25, 1932, Serial No. 588,594

2 Claims. (Cl. 60—54.6)

My invention pertains to a compensating master cylinder which is particularly useful as a part of the hydraulic brake system of an automotive vehicle, although my invention is capable of other uses.

An object of my invention is to provide a new and improved compensating master cylinder.

Another object is to provide a compensating master cylinder which will provide freer flow of fluid past the piston during the return stroke thereof.

Another object is to provide a compensating master cylinder in which a relatively large opening is normally maintained between the master cylinder and the reservoir.

Another object is to provide a novel piston construction for master cylinders.

Another object is to provide a vertically disposed master cylinder in which the highest point in the compression chamber is normally maintained in free communication with the reservoir.

Another object is to provide a vertical master cylinder and reservoir unit in which a greater part of the reservoir is available as a source of fluid supply.

Another object is to provide an improved braking system incorporating my novel master cylinder.

Other objects and advantages will become apparent as the description proceeds.

In the drawing,

Fig. 1 is a sectional elevation showing my new and improved compensating master cylinder;

Fig. 2 is a diagrammatic illustration of a hydraulic braking system incorporating my novel master cylinder; and Fig. 3 is an enlarged view of the piston mechanism shown in Fig. 1 but showing the parts in a different position.

Referring to the drawing, I have indicated a master cylinder at 5 which is provided with integral lugs 6 having bolt holes by means of which the master cylinder may be attached to the frame of an automobile or other suitable support. The upper end of the master cylinder 5 is threaded to receive an annulus 7 which forms the base of the reservoir indicated generally at 8. The reservoir is shown as comprising a relatively narrow strip of metal 9 which has been bent back upon itself to provide folds 10 which afford flexibility to the reservoir.

Above the strip 9 is a sheet metal cup 11 which forms the upper part of the reservoir and which carries a packing gland 12 through which the piston rod 13 passes. The piston rod 13 is enlarged at its upper end, as indicated at 14, and has an adjustable extension 15 by which it is connected to foot pedal 16. Beneath the enlargement 14 is a washer 17 which receives the thrust of a spring 18 resting on the upper end of the cup 11. The spring 18 acts to return the piston rod 13 and pedal 16 to initial position following each application of the brakes.

The foot pedal 16 is pivoted at 19 to the frame or body of the vehicle and where so desired an additional spring 20 may be provided to insure return of the foot pedal and piston rod to initial position. The initial position of the foot pedal 16 may be determined by any suitable stop (not shown) or by one end of the slot in the floor board of the vehicle.

A float 21 has a stem 22 which extends through the upper end of the reservoir and serves as a means to indicate the height of the fluid in the reservoir. The reservoir is filled by unscrewing the plug 23, thereby affording an opening through which fluid may be introduced into the reservoir. Since the foot pedal 16 is pivoted about a fixed pivot 19, the upper end of the reservoir will have a slight lateral movement during each application of the brakes. This movement is provided for by the folds 10 formed in the flexible strip 9. The reservoir structure disclosed herein is claimed in the copending application of Erwin F. Loweke, Serial No. 588,045, filed Jan. 22, 1932, issued as Patent No. 1,981,653.

The master cylinder 5 has a bore 24, the upper end of which connects directly with the reservoir. In this bore is a reciprocable piston, indicated generally by the reference numeral 25. This piston comprises a shell 26 and a relatively movable member 27 which is urged in one direction by the spring 28 which is interposed between opposed surfaces on the shell 26 and member 27. Cooperating shoulders 29 and 30, formed on the shell and member, respectively, limit relative movement of the shell and member in one direction. The shell 26 is made of such size that it fits snugly in the bore 24 of the cylinder and this shell is provided with an opening extending entirely therethrough. It is in this opening that the movable member 27 is located.

The forward end of the opening through the shell 26 is in the form of a cylinder 31 in which the forward cylindrical extension 32 of the movable member fits snugly when the shell 26 and movable member 27 are in the relative positions shown in Fig. 3. In this position shoulders 29 and 30 are in engagement and the forward face of the extension 32 is in the plane of the forward face of the shell 26 so that these faces form a continuous support for the rubber cup 33 which provides a seal between the shell 26 and the cylinder wall and also between the forward face of the shell 26 and the forward face of the cylindrical extension 32 on the movable member 27.

The cup 33 has a central opening 34 which, in the position of the parts shown in Fig. 1, affords a free communication between the upper end of the compression chamber and the reservoir. The complete passageway connecting the upper end of the compression chamber with the reservoir comprises the opening 34 through the cup 33, the cylindrical bore 31 in the forward end of the shell 26, the annular space formed between the shell 26 and the member 27 in which the spring 28 is located, and the small bores 35 formed in the member 27. The rest positions of the shell 26 and member 27 are determined by a stop 36 which is in the form of a cap screwed to the upper end of the cylinder 5. This cap is provided with a central opening through which the piston rod 13 passes and by means of which the bores 35 communicate with the interior of the reservoir. The annular space 37 which is below the top cap 36, constitutes a sediment trap which may be of any desired depth. A drain plug 38 may be provided.

The lower end of the piston rod 13 simply rests in the socket formed in the movable member 27 so that the piston rod 13 and pedal 16 may return to their initial positions faster than the piston 25 is returned to its initial position at the completion of an application of the brakes. The piston is returned to initial position by a spring 39 which exerts its upward force against an annular washer 40 located inside the cup 33. The lower end of the spring 39 rests upon a return valve 41 which is normally held against its seat 42 with sufficient force to require a differential in fluid pressure of approximately nine pounds per square inch to unseat it. The return valve 41 carries an outlet valve 43 which opens under a very light pressure and which is held in closed position by a spring 44.

The outlet end of the master cylinder communicates with conduits 45 which lead to wheel cylinders 46. Each wheel cylinder includes a pair of opposed pistons 47, each of which actuates a brake shoe 48 to force it into engagement with the drum 49 against the tension of a retractile spring 50. The retractile springs 50 normally hold the brake shoes in engagement with suitable stop members indicated at 51.

In the normal or inoperative condition of the braking system the parts are in the position shown in Fig. 1. In this figure the upper end of the compression chamber is in free communication with the reservoir so that any air which may have found its way into the master cylinder can rise in the master cylinder and pass from the highest point of the master cylinder into the fluid reservoir. This communication between the interior of the master cylinder and the reservoir also compensates for changes in the condition of the fluid system due to changes in temperature. Thus, upon expansion of the fluid in the wheel cylinders and conduits, due to a rise in temperature, the valve 41 will be lifted from its seat to permit some of this fluid to flow into the master cylinder, whereupon an equal amount of fluid will be displaced from the upper end of the master cylinder and returned to the reservoir.

When the brake pedal is depressed the first effect is to move the member 27 until its shoulder 30 comes into engagement with the shoulder 29 of the shell 26. This results in a slight compression of the spring 28 which is purposely made of less strength than the spring 39. This initial movement of the member 27 relative to the shell 26 causes the parts to assume the position shown in Fig. 3, wherein the forward face of the projection 32 on the member 27 lies in the same plane as the forward face of the shell 26, the two providing a continuous support for the cup 33. This initial movement of the member 27 relative to the shell 26 is lost motion, in so far as any braking action is concerned, since the sole purpose of this movement is to close the passageway through the piston. This lost motion may be reduced by providing the shell 26 with grooves 52 which afford the necessary opening between the forward end of the shell 26 and the extension 32, with less relative movement between these parts.

Continued depression of the foot pedal causes piston rod 13 to move shell 26 and member 27 as a unit downwardly in the bore 24 to discharge fluid from the master cylinder past valve 43 and into conduits 45. This discharge of fluid from the master cylinder creates pressure in the conduits and wheel cylinders and causes the pistons 47 in the wheel cylinders 46 to move the brake shoes 48 into engagement with the drums 49. When the operator removes his foot from the pedal 16, springs 18 and 20 immediately return foot pedal 16 and piston rod 13 to their initial positions. Spring 28 immediately expands, thereby moving member 27 relative to shell 26 and thus opening a passageway through the piston.

Separating movement of member 27 and shell 26, under the influence of spring 28 during the return stroke of the piston, is limited by the engagement of shoulder 53 with spring ring 54 which is snapped into a suitable groove provided in the upper end of the shell 26.

Spring 39 also expands and pushes the cup 33 and piston back toward initial position. During this return stroke of the piston the spring 39 is also exerting pressure on the return valve 41 which serves to restrict the flow of fluid from the conduits and wheel cylinders back into the master cylinder under the influence of the retractile springs 50. Furthermore, the length and smallness of the conduits and the viscosity of the fluid further restrict this return flow of fluid to the master cylinder. The result is that a partial vacuum or condition of sub-atmospheric pressure is created in the master cylinder during the return stroke of the piston, and this condition causes fluid to flow from the reservoir through the piston and hole 34 in the rubber cup 33 into the master cylinder during the return stroke of the piston.

When the master cylinder piston has reached its initial position, as indicated in Fig. 1, there is an excess of fluid in the operating parts of the system. As the wheel cylinder pistons continue their return to initial or inoperative position, under the influence of their retractile springs, fluid is continually returned to the master cylinder and the excess escapes back to the reservoir through the opening 34 in the cup 33 and between the two parts of the piston. This excess fluid carries with it any air which may have found its way into the operative parts of the system. Because of the fact that the passageway which connects the master cylinder with the reservoir is located at the very top of the compression chamber, all air bubbles are completely purged from the master cylinder.

While I have illustrated my invention as incorporated in a single embodiment, it is to be understood that my invention may take many forms and that the scope of my invention is to be limited solely by the following claims.

I claim:

1. In a hydraulic pressure system of the class described, the combination of a cylinder, a piston therein, said piston comprising relatively movable parts, a spring interposed between said parts, means to advance said piston, a spring in said cylinder for retracting said piston, said last-named spring being stronger than said first-named spring, and a fluid reservoir in communication with the rear of said piston, said movable parts in separated position being conformed to provide a passageway therethrough, which passageway disappears when said parts are moved to closed position whereby movement between said parts controls communication between said cylinder and said reservoir.

2. In a hydraulic pressure system of the class described, the combination of a compression cylinder, a piston therein comprising relatively movable parts, said parts in one position being conformed to provide an imperforate piston and when in a second position being conformed to provide a passageway therebetween, a relatively light spring for separating said parts to provide a passageway therebetween, means to advance said piston, a relatively strong spring in said cylinder for retracting said piston, a single stop for limiting retraction of both parts of said piston and for permitting said first-named spring to hold said parts in separated relationship, and a fluid reservoir in communication with the rear of said piston, whereby said movable parts control communication between said cylinder and said reservoir.

HERBERT C. BOWEN.